(12) United States Patent
VandeHaar et al.

(10) Patent No.: US 11,666,072 B2
(45) Date of Patent: Jun. 6, 2023

(54) SUPPLEMENTATION OF BOVINE COLOSTRUM WITH OMEGA-3 FATTY ACIDS

(71) Applicant: Board of Trustees of Michigan State University, East Lansing, MI (US)

(72) Inventors: Michael J. VandeHaar, Eaton Rapids, MI (US); Julie Opgenorth, Ames, IA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 123 days.

(21) Appl. No.: 16/906,371

(22) Filed: Jun. 19, 2020

(65) Prior Publication Data
US 2020/0397022 A1 Dec. 24, 2020

Related U.S. Application Data

(60) Provisional application No. 62/863,461, filed on Jun. 19, 2019.

(51) Int. Cl.
*A61K 35/20* (2006.01)
*A23K 20/158* (2016.01)
*A23K 10/20* (2016.01)
*A23K 50/10* (2016.01)
*A23K 20/174* (2016.01)

(52) U.S. Cl.
CPC .......... *A23K 20/158* (2016.05); *A23K 10/20* (2016.05); *A23K 20/174* (2016.05); *A23K 50/10* (2016.05)

(58) Field of Classification Search
CPC .............................. A23K 20/158; A23K 50/60
See application file for complete search history.

(56) References Cited

PUBLICATIONS

Opgenorth et al, Colostrum supplementation with omega-3 fatty acids and α-tocopherol decreases indicators of oxidative stress and alters plasma fatty acid profile in newborn calves during the first week of life. 28th Annual Tri-State Dairy Nut. Conference, Fort Wayne, Indiana, USA, Apr. 22-24, 2019 (Year: 2019).*
Hill, T. M., et al., "Fatty acid intake alters growth and immunity in milk-fed calves", *Journal of Dairy Science*, 94, (2011), 3936-3948.
Opgenorth, Julie, et al., "Colostrum supplementation of omega-3 fatty acids does not alter calf outcome on a healthy commercial farm", *Journal of Dairy Science*, 103(12), (2020), 11689-11696.
Opgenorth, Julie, et al., "Colostrum supplementation with n-3 fatty acids alters plasma polyunsaturated fatty acids and inflammatory mediators in newborn calves", *Journal of Dairy Science*, 103(12), (2020), 11676-11688.
Opgenorth, Julie, et al., "Colostrum supplementation with n-3 fatty acids and α-tocopherol alters plasma polyunsaturated fatty acid profile and decreases an indicator of oxidative stress in newborn calves", *Journal of Dairy Science*, 103(4), (2020), 3545-3553.

* cited by examiner

*Primary Examiner* — Qiuwen Mi
(74) *Attorney, Agent, or Firm* — Schwegman Lundberg & Woessner, P.A.

(57) ABSTRACT

Described herein are compositions and methods that involve use of omega-3 polyunsaturated fatty acids (e.g., fish oil and/or flax oil) as supplements to colostrum. When administered to newborn calves the combination of colostrum with fish oil and/or flax oil can improve the health and immune function of the calf.

7 Claims, 4 Drawing Sheets

SUPPLEMENTATION OF BOVINE COLOSTRUM WITH OMEGA-3 FATTY ACIDS

This application claims benefit of priority to the filing date of U.S. Provisional Application Ser. No. 62/863,461, filed Jun. 19, 2019, the contents of which are specifically incorporated herein by reference in their entirety.

BACKGROUND

Heifer calves are the future for a dairy herd. They typically have the best genetics on the farm, and calves that grow well in the milk-feeding phase generally produce more milk as cows (Davis-Rincker et al., 2011; Soberon and Van Amburgh, 2013). Getting calves off to a good start in life is one key to a successful dairy industry. Improvements in hygiene and management have made a large impact on dairy herd health. But problems still persist. Based on 2007 statistics provided by the National Animal Health Monitoring Service (NAHMS), 8% of dairy heifer calves in the United States die before they reach the age of weaning. Of these deaths, about half are caused by digestive problems and about half are caused by respiratory disease. Hence, a long-standing problem exists relating to the incidence of death and poor health in newborn calves.

SUMMARY

Described herein are compositions and methods that enhance immune function in calves. The compositions and methods include omega-3 polyunsaturated fatty acids (PUFAs) and colostrum that can be given as a one-time colostrum supplement to newborn dairy calves within 12-24 hours of birth. Newborn calves are susceptible to oxidative stress and inflammatory dysfunction at birth, which can decrease their systemic immune potential after birth (Lago et al. 2018). Although antibiotics have been used to combat infections, antibiotic usage is becoming more limited due to concerns about development of antimicrobial resistance. Hence, good immune function amongst dairy herds, especially amongst newborn calves, is becoming more and more important. The compositions, food supplements, and methods described herein can improve such immune function.

Described herein is a composition that provides a food supplement for young animals. The composition consists essentially of omega-3 fatty acids with colostrum. The omega-3 fatty acids can be provided as a supplement that is mixed with colostrum. The omega-3 fatty acids can be about 5-55% by weight of the colostrum-omega-3 mixture. Such omega-3 fatty acids can be from fish oil, flax oil, or a combination thereof. The omega-3 fatty acids with colostrum composition can be a creamy oil-in-water emulsion. The composition can also include surfactants, milk solids, sweeteners, flavoring agents, antioxidants, vitamins, preservatives, water (e.g., in an amount of 35-55% by weight), or combinations thereof. The surfactants and/or milk solids can facilitate formation of a stable oil-in-water emulsion with the colostrum and omega-3 fatty acids. However, milk solids are optional and may not be used in some cases. If additional milk solids are present that can be added in an amount of about 4 to about 5% by weight of the composition. In addition, the composition can include vitamin E in an amount that is beneficial to the calves and/or that prevents oxidation of the fatty acids. A preservative can be present in an amount to inhibit microbial growth.

For example, the supplements and compositions can include omega-3 fatty acids as a mixture of flaxseed and fish oils such as a 1:1 mixture of flaxseed and fish oils. In some cases, use of higher proportions of flax seed oils can be more palatable to calves. Hence, in some cases the ratio of flaxseed to fish oils is greater than 1:1. For example, the ratio of flaxseed and fish oils can be 2:1, or 3:1, or 4:1, or 5:1, or 6:1. However, in other cases, increased fish oil can provide benefits. Hence, in some cases the ratio of fish oils to flaxseed oils is greater than 1:1. For example, the ratio of fish oils to flaxseed oils can be 2:1, or 3:1, or 4:1, or 5:1, or 6:1.

The composition can include a surfactant that helps to emulsify the oils in the colostrum. In some cases, the surfactant is a nonionic surfactant. Examples of surfactants that can be used include Tween 80 (polysorbate 80), Tween 60, or a combination thereof.

Also described herein are methods that include administering to one or more newborn calves about 30-120 milliliters of a supplement that consists essentially of 1-55% by weight omega-3 fatty acids that is added (e.g., in a mixture or an oil-in-water emulsion) to colostrum to produce one or more treated calves. For example, calves are at risk of increased oxidative stress at birth. In some cases, one or more newborn calves are under-weight newborn calves, newborn calves with weak calf syndrome, or newborn calves that are unable or slow to rise, stand or nurse. The food supplements and compositions described herein may be particularly useful for such calves.

In some cases, the supplement is administered that includes a mixture of omega-3 polyunsaturated fatty acids (PUFAs such as flaxseed oils and/or fish oils) while the calf separately receives colostrum. In some cases, the calf receives at least 30 mL, or at least about 40 mL, or at least about 50 mL, or about 60 mL of a supplement that includes about a flaxseed:fish oil blend. The composition can include colostrum, or the supplement can be administered while the calf receives colostrum either naturally from its mother, or separately from another source. The supplements and compositions so administered can include vitamin E, Tween 80 (polysorbate 80), or a combination thereof.

DESCRIPTION OF THE FIGURES

FIG. 1A graphically illustrates the concentration of α-linolenic acid (ALA) in the plasma of calves who received colostrum supplemented with fish/flax oil (n=16) within 12 hours of birth. FIG. 1B graphically illustrates the concentration of eicosapentaenoic acid (EP) in the plasma of calves who received colostrum supplemented with fish/flax oil (n=16) within 12 hours of birth. FIG. 1C graphically illustrates the concentration of docosahexaenoic acid (DHA) in the plasma of calves who received colostrum supplemented with fish/flax oil (n=16) within 12 hours of birth. FIG. 1D graphically illustrates the oxidant status index of calves who received colostrum supplemented with fish/flax oil (n=16) within 12 hours of birth.

DETAILED DESCRIPTION

Figure 1A:
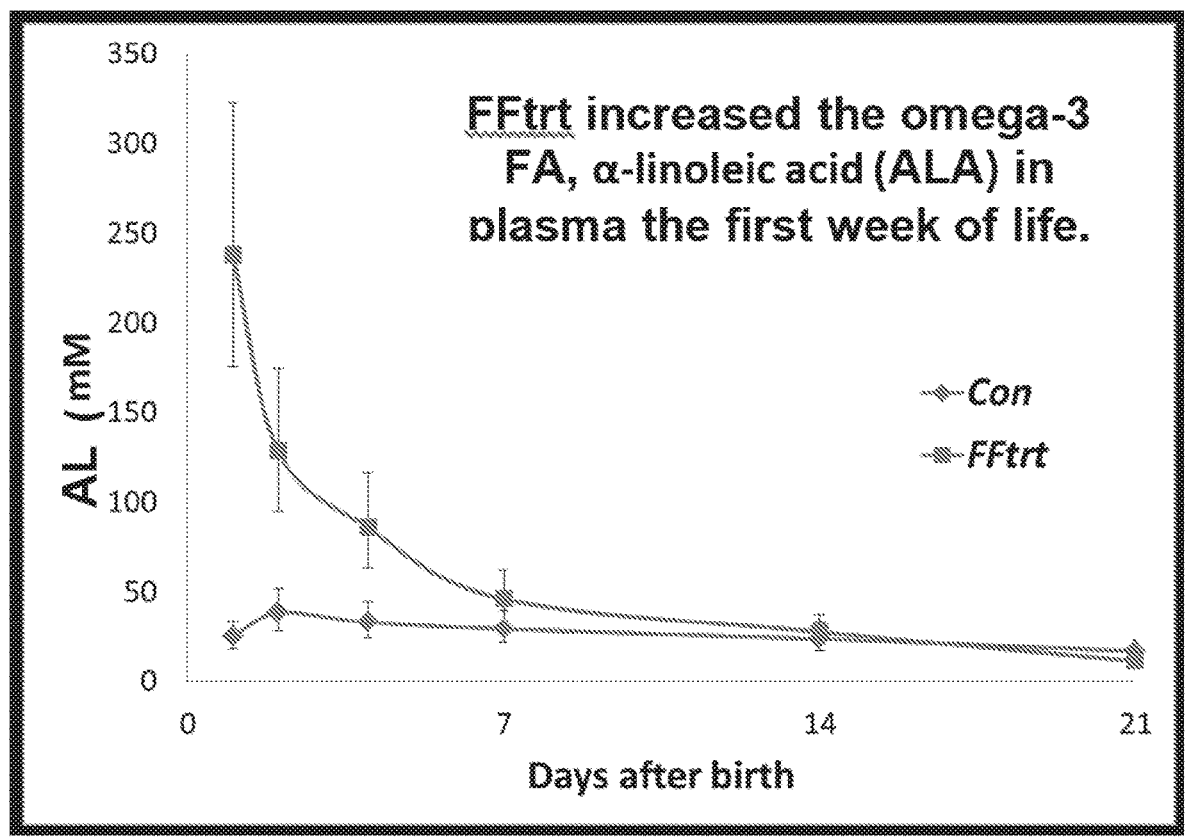
FIG. 1A-1D illustrate concentrations of polyunsaturated fatty acids (PUFAs) over time in the plasma of calves who received colostrum supplementation with fish/flax oil (n=16) within 12 hours of birth. Note that FFtrt refers to the colostrum/fish oil/flax oil supplement.

Compositions and methods are described herein that enhance immune function in calves. The supplements, compositions and methods include use of omega-3 oils (fish oil and/or flax oil) that can be given just once to newborn dairy calves within 24 hours of birth. In some cases, the newborn calves to be treated are under-weight newborn calves, newborn calves with weak calf syndrome, calves rejected by their mothers, or newborn calves that are unable or slow to rise, stand or nurse. Supplementation immediately after birth can be more effective than supplementation of the diet later. A blend of fish and flax can, in some cases, be provided as a supplement that has a balanced mix of omega-3 fatty acids. By giving these fatty acids at birth, their concentrations are elevated in the newborn for the first week or two of life and thus be present during the development of new immune cells that will protect the newborn during the critical early period of its life.

Approximately 18% of all heifers on farms are treated with antibiotics for digestive problems, and 11% were treated with antibiotics for respiratory disease (NAHMS, 2007). However antibiotic usage is becoming more limited to prevent antimicrobial resistance. By providing newborn calves with the supplements described herein such antibiotic usage can be reduced along with the incidence of antibiotic resistance. For example, if a newborn calve is suspected of having or of developing disease (e.g., respiratory disease) the supplement—colostrum composition can be administered.

Omega-3 Fatty Acids

Mammals can make almost all of the fatty acids needed for good health except for fatty acids in the n-3 (omega-3) and n-6 (omega-6) families of polyunsaturated fatty acids (PUFAs). Such polyunsaturated fatty acids need to be supplied in the diet. Omega-3 (n-3) polyunsaturated fatty acid supplementation has therefore gained popularity recently as a method for improving cardiovascular and immune health in mammals, especially humans, although there is conflicting support for these outcomes (Anandan 2009, Hooper et al. 2006).

The first two weeks in the life of a calf are a critical time because susceptibility to infections is elevated. Calf pre-weaning mortality is highest in the first few days after birth. However, no omega-3 supplement currently on the market targets calves in the first day of life.

There are two main sources of omega-3 polyunsaturated fatty acids: fish oil and flax oil. Fish oil is rich in eicosapentaenoic acid (EPA) and docosahexaenoic acid (DHA) while flax oil contains mostly α-linolenic acid (ALA). Structures for three types of n-3 polyunsaturated fatty acids are shown below.

There is about 7 g of omega-3 fatty acids in 15 ml of flax oil. Hence, 30 ml of flax oil contains about 14 g of omega-3 fatty acids. Fish oil has about 30% omega-3 fatty acids, and because the density of fish oil is about 0.93 g/mL, 15 ml of fish oil provides about 4.65 g of omega-3 fatty acids, and 30 ml of fish oil provides about 9.3 g omega-3 fatty acids.

An omega-3-colostrum supplement composition is described herein. The omega-3 fatty acids included in the supplement can be a 1:1 mixture of flaxseed and fish oils. For example, the omega-3 component can in some cases include about 1% fish oil, about 2% fish oil, about 5% fish oil, about 10% fish oil, about 20% fish oil, about 30% fish oil, about 40% fish oil, about 50% fish oil, about 60% fish oil, about 70% fish oil, about 80% fish oil, about 90% fish oil, or about 95% fish oil, where the remainder of the PUFAs are flax seed oils.

The omega-3 fatty acid mixture can include, for example, about 1% flax seed oil, about 2% flax seed oil, about 5% flax seed oil, about 10% flax seed oil, about 20% flax seed oil, about 30% flax seed oil, about 40% flax seed oil, about 50% flax seed oil, about 60% flax seed oil, about 70% flax seed oil, about 80% flax seed oil, about 90% flax seed oil, or about 95% flax seed oil, where the remainder of the PUFAs are fish seed oils.

In some cases, use of higher proportions of flax seed oils can be more palatable to calves. The α-linolenic acid (ALA) in flax oil can also be converted to eicosapentaenoic acid (EPA) and/or docosahexaenoic acid (DHA). Hence, in some cases the ratio of flax oil to fish oil is greater than 1:1, for example, the ratio of flax oil to fish oil can be 2:1, or 3:1, or 4:1, or 5:1, or 6:1.

However, in some cases, fish oil can provide added benefits, for example, because it contains high levels of eicosapentaenoic acid (EPA) and/or docosahexaenoic acid (DHA). Hence, for example, the ratio of fish oil to flaxseed oil is greater than 1:1, for example, the ratio of fish oil to flaxseed oil can be 2:1, or 3:1, or 4:1, or 5:1, or 6:1.

In terms of weight percentages, the supplement can contain about 2 g to 30 g omega-3 fatty acids, or about 3 g to about 25 g omega-3 fatty acids, or about 4 g to about 20 g omega-3 fatty acids, or about 5 g to about 15 g omega-3 fatty acids.

Colostrum

Colostrum is the first form of milk produced by the mammary glands of mammals (including many humans) immediately following delivery of a newborn. Hence, the colostrum used in the compositions described herein can be maternal colostrum. In other words, the colostrum can be

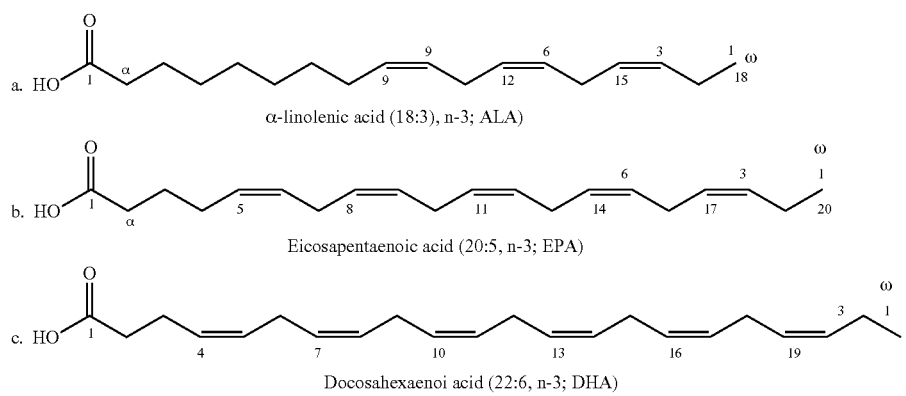

a. α-linolenic acid (18:3), n-3; ALA)

b. Eicosapentaenoic acid (20:5, n-3; EPA)

c. Docosahexaenoi acid (22:6, n-3; DHA)

collected from the mother, mixed with the food supplement, and this mixture can be provided to the mother's offspring. In some instances, colostrum can be collected from any female mammal who is pregnant or who has just given birth to her offspring, and the collected colostrum can be stored for use later. For example, aliquots of collected colostrum can be frozen and then thawed for use later.

Most species will generate colostrum just prior to giving birth. Hence, the colostrum can be collected at the time of birth, just prior to birth, or shortly after birth. In general, the colostrum is collected within about 30 minutes to about 12 hours of birth.

Colostrum contains antibodies to protect the newborn against disease. In many cases, protein concentrations in colostrum are substantially higher than in milk. Fat concentrations are substantially higher in colostrum than in milk in some species such as sheep and horses, but lower in colostrum of some other species such as camels and humans. Fat concentrations in bovine colostrum is variable.

In some cases, the colostrum used in the compositions described herein can have about 3% to 40% fat, or about 4% to 30% fat, or about 5% to about 15% fat, or about 5% to about 10% fat.

Colostrum can also have varying amounts of sugars. In general, colostrum has a lower sugar content than later-produced milk. For example, lactose concentrations as low as 1.2% have been reported in colostrum. In addition to lactose, milk can contain trace amounts of other sugars, including glucose, fructose, glucosamine, galactosamine, N-acetylneuraminic acid and oligosaccharides. For example, the colostrum employed can have ≥22% as determined with a Brix refractometer.

The concentration of casein is generally higher in colostrum than in milk. For example, early post-partum milk may contain reduced proportions of $\alpha_s$-casein, which may increase with time post-partum, and elevated proportions of κ-casein, which may decrease with time post-partum, while the proportion of β-casein can remain constant throughout.

There are three major classes of immunoglobulins in milk, i.e. IgG, IgM and IgA, which account for about 1% of the total milk protein or about 6% of the total whey protein. Immunoglobulins make up 70-80% of the total protein in colostrum, which is of particular importance to the neonate, as transfer of passive immunity to the neonate occurs through colostrum and not via the placenta.

Surfactants

The compositions can optionally include one or more types of surfactants. Such surfactants are particularly useful in colostrum-containing compositions, for example, to aid in emulsification.

About 0.01% to about 2% surfactant by volume can be present in the colostrum-containing composition. In some case, the surfactant can be present at about 0.05% to about 1.5% by volume, or about 0.1% to about 1.0% by volume, or about 0.2% to about 0.8% by volume, or about 0.3% to about 0.5% by volume, or about 0.4% by volume surfactant in the colostrum-containing composition.

Examples of surfactants that can be used include anionic surfactants, cationic surfactants, zwitterionic surfactants, nonionic surfactants, or a mixture thereof. In some cases, the surfactant is a nonionic surfactant, or a mixture that contains more nonionic surfactant than anionic surfactants, cationic surfactants, or zwitterionic surfactants.

Anionic surfactants have anionic functional groups at their head, such as sulfate, sulfonate, phosphate, or carboxylate. The anion can also include a halide such as chloride (Cl-), bromide (Br-), or iodide (I-)). Examples of alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), sodium myreth sulfate, docusate (dioctyl sodium sulfosuccinate, perfluorooctanesulfonate (PFOS), perfluorobutanesulfonate, alkyl-aryl ether phosphates, alkyl ether phosphates, and combinations thereof. Carboxylate surfactants have carboxylate salts (soaps), such as sodium stearate. More specialized types of carboxylate surfactants include sodium lauroyl sarcosinate and carboxylate-based fluorosurfactants such as perfluorononanoate, perfluorooctanoate (PFOA or PFO).

Cationic surfactants generally have pH-dependent primary, secondary, or tertiary amines, including primary and secondary amines that become positively charged at pH greater than 10. Examples of the cationic portion can include ammonium, pyridinium, triethanolamine, or combinations thereof. Such cationic surfactants can, for example, include octenidine dihydrochloride or a permanently charged quaternary ammonium salt such as cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), or a combination thereof.

Zwitterionic (amphoteric) surfactants have both cationic and anionic centers attached to the same molecule. The cationic part is based on primary, secondary, or tertiary amines or quaternary ammonium cations. The anionic part can be more variable and can include sulfonates, such as in the sultaines CHAPS (3-[(3-Cholamidopropyl)dimethylammonio]-1-propanesulfonate) and cocamidopropyl hydroxysultaine. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolamine, phosphatidylcholine, and sphingomyelins.

Nonionic surfactants have covalently bonded oxygen-containing hydrophilic groups, which are bonded to hydrophobic parent structures. The water-solubility of the oxygen groups is generally the result of hydrogen bonding. Hydrogen bonding decreases with increasing temperature, and the water solubility of nonionic surfactants therefore also decreases with increasing temperature. Nonionic surfactants are less sensitive to water hardness than anionic surfactants, and they foam less strongly. The choice of nonionic surfactant can be made on factors such as the costs, the effectiveness in a providing desirable properties for a particular composition, the toxicity, the dermatological compatibility, the biodegradability, whether the surfactant is appropriate for use in food, or a combination thereof.

Examples of nonionic surfactants include ethoxylates, octaethylene glycol monododecyl ether, pentaethylene glycol monododecyl ether, alkylphenol ethoxylates (APEs), nonoxynols, triton X-100, fatty acid ethoxylates, polyethoxylated tallow amine, cocamide monoethanolamine, cocamide diethanolamine, poloxamers, glycerol monostearate, glycerol monolaurate, sorbitan monolaurate, sorbitan monostearate, sorbitan tristearate, alkyl polyglycosides, decyl glucoside, lauryl glucoside, octyl glucoside, lauryldimethylamine oxide, Tween 20, Tween 40, Tween 60, Tween 80, or combinations thereof.

In some cases, the surfactant is a nonionic surfactant such as Tween 80.

Vitamins

The supplements and compositions can also include vitamins and minerals.

For example, the supplements and compositions can include vitamins and/or minerals such as calcium phosphate (e.g., tribasic), calcium acetate (e.g., tribasic), potassium phosphate (e.g., dibasic), magnesium sulfate, magnesium oxide, sodium chloride, potassium chloride, potassium acetate, ascorbic acid, ferric orthophosphate, niacinamide; zinc sulfate, zinc oxide, calcium pantothenate, copper gluconate, riboflavin, beta-carotene, pyridoxine hydrochloride, thiamin mononitrate, folic acid, biotin, chromium chloride, chromium picolonate, potassium iodide, sodium selenite, sodium molybdate, phylloquinone, vitamin D3, cyanocobalamin, vitamin E, copper sulfate, vitamin A, vitamin C, inositol, potassium iodide, or combinations thereof. In some cases, the compositions contain at least vitamin E.

The vitamins and minerals can be included in effective amounts within the supplements and compositions described herein. For example, vitamin E can be present at about 0.001 mg/ml to about 1 mg/ml, or about 0.01 mg/ml to about 0.5 mg/ml, or about 0.02 mg/ml to about 0.1 mg/ml, or about 0.04 mg/ml to about 0.08 mg/ml, or about 0.06 mg/ml to about 0.07 mg/ml.

Timing

Calves are administered the supplements and/or compositions described herein within about 3 minutes to about 24 hours of birth. In some cases, the calves are administered the supplements and/or compositions described herein at least once within about 5 minutes to about 12 hours of birth, or within about 24 hours of birth. In some cases, the calves are administered the supplements and/or compositions described herein at least twice within about 5 minutes to 16 hours of birth.

In some cases, within the first six hours of birth calves are administered about 5-6% of the calfs body weight of the composition containing colostrum, and then the same amount again at about 10-14 hours. For a 90-pound calf, this amount would be approximately 2 to approximately 4 quarts per feeding, or about 2.5 to about 3.5 quarts per feeding, or about 2.7 to about 3.3 quarts of the colostrum-omega-3 composition.

Therapeutic Methods

Methods are described herein that involve administering to a newborn calf a supplement that includes about 2 g to 80 g omega-3 fatty acids, or about 3 g to about 70 g omega-3 fatty acids, or about 4 g to about 60 g omega-3 fatty acids, or about 5 g to about 50 g omega-3 fatty acids, or about 10 to about 40 g omega-3 fatty acids. The omega-3 fatty acids can be provided by flax oil, fish oil, or a combination thereof. The supplement can be mixed with colostrum. For example, a composition can be administered that is an emulsion that includes omega-3 fatty acids and colostrum.

In some cases, the omega-3 supplement is administered independently or separately from colostrum. For example, the omega-3 fatty acids can be administered without colostrum and the calves can receive colostrum by nursing with their mothers. However, it is desirable to mix colostrum with the omega-3 fatty acids, for example, to provide optimal nutrition and immune system benefits to the calves, and to make the supplement more palatable for the calves.

The calves are administered the supplement with colostrum (e.g., as a composition) at about 15 minutes to about 12 hours after birth of the calf, or about 30 minutes to about 11 hours after birth of the calf, or about 1 hours to about 10 hours after birth of the calf, or about 1 hours to about 9 hours after birth of the calf, or about 1 hours to about 7 hours after birth of the calf. A second administration can be provided within 3 to 12 hours of the first administration to the calves. For example, a composition containing a mixture of omega-3 fatty acids (e.g., flax oil, fish oil, or a combination thereof) with colostrum can be administered to a calf at about 30 minutes to 6 hours after birth, and then again at about 6 hours to about 18 hours after birth.

The colostrum can be from any female, for example, any bovine female. However, in some cases, the colostrum is from the mother of the calf. In some cases, the colostrum is administered separately from the flax/fish oil supplement. However, the fish/flax oil supplement is generally mixed with colostrum to facilitate administration to the calf. For example, a supplement of the omega-3 fatty acids with vitamin E and other components can be packaged without colostrum, and when a calf is born, the omega-3 fatty acid supplement can be added to colostrum obtained from the calf's mother or from another cow to generate the final mixture that is administered to the calf.

The amounts of colostrum with supplemental flax/fish oil to be fed to calves shortly after birth can be about 1 liter to about 5 liters, or about 2 liters to about 4 liters, or about 2.8 to 3 liters.

For example, calves can be fed about 2.8 to 3 liters colostrum mixed with about 60 ml of a 1:1 flaxseed:fish oil blend, 200 mg vitamin E, and 12 ml polysorbate 80.

Oxidative stress occurs when antioxidants fail to neutralize an overabundant concentration of reactive oxygen species, resulting in damage to cellular components. This phenomenon is prevalent in neonatal calves, potentially causing disease vulnerability and immune dysfunction (Ling et al., 2018). Studies described herein illustrate the benefits of fish and flax oil on calf health and growth. The omega-3 polyunsaturated fatty acids (n-3 PUFAs) may mediate inflammation and reduce oxidative stress through their anti-inflammatory and antioxidant properties.

Oxidant status and total antioxidant status can be measured in a variety of ways. For example, the methods described in Ling (2018) can be employed. In some cases, the methods and kits from Rel Assay Diagnostics® (see website at relassay.com) can be used. Oxidative stress can also be evaluated by measuring reactive oxygen metabolites (ROMs) and biological antioxidant potential (BAP) in fresh blood and the degree of oxidative stress can be expressed as an oxidative stress index (OSI), where OSI=ROMs/BAP× 100. See, e.g., Ranade et al. Vet. J 202(3): 583-37 (2014).

The inventors have tested whether a 60 mL fish and flax oil colostrum supplement would improve indicators of calf health and plasma concentrations of n-3 PUFAs during the first week of life. Sixteen Holstein calves were blocked by sex and birth date and randomly assigned to control (no supplement; Con), or fish and flax oil (FFtrt) supplemented in first colostrum (3 L within 6 hours, >22% on Brix). FFtrt was a 60 mL 1:1 blend of oils with 200 mg α-tocopherol.

FFtrt did not alter concentration of total protein in blood serum, prevalence of diarrhea or other signs of disease, or rate of growth (P>0.05). FFtrt increased plasma concentrations of n-3 FA as much as 90% within 1 day of age (P<0.001). FFtrt decreased oxidant status by 55% within 2 days of age (P<0.01). Oxidant status and FA returned to control values by day 14 after birth. In conclusion, a colostrum supplement of n-3 FAs and α-tocopherol can improve calf health by decreasing oxidant status and increasing plasma n-3 PUFA concentrations in the first week of life.

The transition period at birth is physiologically stressful on the calf at parturition, contributing to an increased risk of immune dysfunction and oxidative stress (Ling et al., 2018). Unresolved inflammation and oxidative stress can lead to decreased calf vitality (Abuelo et al., 2013). Omega-3 polyunsaturated fatty acids (n-3 PUFAs) produce cell mediators during metabolism that function to resolve and repair inflammatory and oxidative damage (Mavangira and Sordillo, 2018).

The inventors have tested whether up to 120 mL n-3 fatty acid-enriched oils supplemented within colostrum would linearly decrease oxidative stress, increase n-3 byproducts of PUFA metabolism, and increase plasma n-3 fatty acids during the first week of life. Twenty Holstein calves were randomly assigned to receive 0 (Con), 30, 60, or 120 mL of a 1:1 mix of fish and flax oils (FFtrt30, 60, 120) supplemented in colostrum. All calves received 3 L colostrum within 6 hours of birth. Blood was sampled before colostrum feeding and on days 1, 2, 4, 7, and 14 of age to assess plasma fatty acids, phospholipid fatty acids, oxidative stress, and oxylipid concentrations. Health indicators were observed daily. Data were analyzed with a mixed procedure using SAS version 9.4 with polynomial contrasts and Tukey's adjusted values to compare treatments. FFtrt30, 60, and 120 exhibited greater concentrations of n-3 FA in plasma as free and phospholipid FA ($P<0.01$) and some PUFA derived oxylipids involved in inflammatory pathways ($P<0.05$) but did not change OS significantly compared to control ($P=0.35$). Treatments did not alter health or growth ($P>0.22$). In conclusion, a colostrum supplement of n-3 FAs administered in volumes of 30, 60, and 120 mL exhibited positive linear effects of n-3 PUFA metabolite concentrations and plasma n-3 FA levels but did not alter overall OS. Changes in FA and oxylipid profiles may promote calf vitality.

Manufacturing Methods

To manufacture the supplements, the selected amounts and/or types of omega-3 fatty acids are mixed together with colostrum. Optionally, vitamin E, Tween 80 (polysorbate 80), or a combination thereof are also mixed with the omega-3 fatty acids either before addition to the colostrum or during mixture of the omega-3 fatty acids and the colostrum.

In terms of weight percentages, the supplement composition can contain about 2 g to 30 g omega-3 fatty acids, or about 3 g to about 25 g omega-3 fatty acids, or about 4 g to about 20 g omega-3 fatty acids, or about 5 g to about 15 g omega-3 fatty acids.

The omega-3 fatty acids can be supplied as fish oil, flax oil or a mixture thereof. Amounts of fish oil and flax oil included can vary relative to the amount of colostrum. In some cases, the volume of fish oil can be about 0.5% to about 20%, or about 1% to about 10%, or about 1.5% to about 7% of the volume of colostrum. Similarly, the volume of flax oil can be about 1% to about 10%, or about 1% to about 10%, or about 1.5% to about 7% of the volume of colostrum.

Vitamin E can be present in amounts of about 5 mg to about 300 mg, about 20 mg to about 200 mg, or about 40 mg to about 100 mg per liter of colostrum.

Tween 80 (polysorbate 80) can be present in about 0.5 ml to about 20 ml, about 1 ml to about 15 ml, or about 2 ml to about 10 ml per liter of colostrum.

For example, in some cases, 2.8 to 3 liters of colostrum can be combined with:
  30 ml fish oil
  30 ml flax oil
  200 mg vitamin E
  12 ml Polysorbate 80.

The components are mixed to distribute the ingredients throughout the formulation.

In some cases, the following are provided as a supplement that can be added to about 2.8 to 3 liters of colostrum just before use:
  30 ml fish oil
  30 ml flax oil
  200 mg vitamin E
  12 ml Polysorbate 80.

Such a supplement can be packaged and sold without colostrum and with instructions for mixing with colostrum and feeding to calves.

The following Examples illustrate some of the experimental work involved in the development of the invention. Appendix A may provide further information.

Example 1: Flax Seed Oil or Fish Oil Improves Health of 4-28 Day-Old Calves

This Example shows that adding flax seed oil or fish oil to calves 4-28 days after birth. Growth and health of calves was improved and the inflammatory response of calves to *Pasteurella* vaccine was decreased. See Karcher et al. *Comparison of supplementation of n-3 fatty acids from fish and flax oil on cytokine gene expression and growth of milk-fed Holstein calves*, J Dairy Sci 97(4):2329-37 (2014)).

Methods

Calfmilk replacer (MR) was employed that had 17% fat, and 27% crude protein on a dry matter (DM) basis, where all protein from whey sources.

Calfmilk replacer was supplemented with either 2% fish or 2% flax oil. This gave omega-6 to omega-3 ratios of 13 omega-6:omega-3 for control MR, 1.7 omega-6:omega-3 for flax-supplemented MR, and 3.5 omega-6:omega-3 for fish-supplemented MR.

Calves were each fed 654 g dry matter of MR daily for the first 25 days and then 327 g/day for days 26, 27, and 28. On d28, calves were challenged with a *Pasteurella* vaccine and the temperature response to the vaccine was recorded. Milk and feed intake and fecal scores were recorded daily, and body weight and hip width were recorded weekly. Blood was collected from all calves on day 25. One tube of collected blood was incubated with endotoxin (lipopolysaccharide; LPS) for 2 h and frozen with a second tube of control blood. Quantitative real-time PCR was used to assess the effects of LPS stimulation on cytokine gene expression.

Results

Both omega-3 supplements improved growth and health of calves and decreased the inflammatory response of calves to *Pasteurella* vaccine at 4 weeks after initiation of treatments, with flax oil being more effective than fish oil.

At 28 days, calves supplemented with flax oil had a greater growth rate and feed efficiency than calves fed fish oil ($0.52\pm0.02$ vs. $0.48\pm0.02$ g of gain:gram of feed). Fish oil tended to decrease LPS stimulation of tumor necrosis factor-$\alpha$ expression. Flax oil, but not fish oil, decreased the expression of IL-4 and tended to decrease expression of osteopontin and IL-8. Flax oil also tended to reduce the increase in rectal temperature in response to a *Pasteurella* vaccine.

Interleukin 4 (IL4, IL-4) is a cytokine that induces differentiation of naive helper T cells (Th0 cells) to Th2 cells. Upon activation by IL-4, Th2 cells subsequently produce additional IL-4 in a positive feedback loop. IL-8 is a chemotactic factor that attracts neutrophils, basophils, and T-cells, but not monocytes. IL-8 is also involved in neutrophil activation.

Osteopontin (OPN, also called secreted phosphoprotein 1) is a secreted protein with a variety of functions, including immunologic functions such as T-cell activation, Th1 differentiation, B-cell activation, and macrophage activation and chemotaxis, as well as roles in wound healing and bone formation These data indicate that supplementation with n-3 fatty acids affects cytokine gene expression in 4-day to 28-day old calves.

Example 2: Supplementation of Colostrum with Omega-3 Fatty Acids

This Example illustrates that a one-time dose of colostrum supplemented with omega-3 fatty acids within 6 to 12 hours of birth increases systemic levels of omega-3 fatty acids and supports calf health.

Methods

Tests were performed to ascertain whether colostrum supplemented with up to 120 mL n-3 FA enriched oils could linearly decrease oxidative stress, increase n-3 byproducts of PUFA metabolism, and increase plasma n-3 fatty acids during the first week of life. Twenty Holstein calves were randomly assigned to receive 0 (Con), 30, 60, or 120 mL of a 1:1 mix of fish and flax oils (FFtrt30, 60, 120) supplemented in colostrum. All calves received 3 L colostrum within 6 hours of birth. Blood was sampled before colostrum feeding and on days 1, 2, 4, 7, and 14 of age to assess plasma fatty acids, phospholipid fatty acids, oxidative stress, and oxylipid concentrations. Health indicators were observed daily. Data were analyzed with a mixed procedure using SAS version 9.4 with polynomial contrasts and Tukey's adjusted values to compare treatments.

Results

Calves that received colostrum supplemented with 30 ml, 60 ml, and 120 ml FFtrt exhibited greater concentrations of n-3 fatty acids in their plasma as free and phospholipid fatty acids (P<0.01) and some PUFA derived oxylipids involved in inflammatory pathways (P<0.05) but did not change oxidative stress significantly compared to control (P=0.35). Treatments did not alter health or growth (P>0.22).

In conclusion, a colostrum supplement of n-3 FAs administered in volumes of 30, 60, and 120 mL exhibited positive linear effects of n-3 PUFA metabolite concentrations and plasma n-3 FA levels but did not alter overall oxidative stress.

Example 3: Administration of Omega-3 Fatty Acids to Calves in the First Day of Life This Example illustrates that a one-time dose of omega-3 fatty acids within 6 to 12 hours of birth increases systemic levels of omega-3 fatty acids and supports calf health in the critical first week of life.

Methods

Sixteen Holstein calves were blocked by sex and birth date, and randomly assigned to control (no supplement; Con), or fish and flax oil (FFtrt) supplemented in first colostrum (3 L within 6 hours >22% on Brix). The FFtrt supplement included 60 mL of 1:1 blend of flax seed oils and fish oils, with 200 mg α-tocopherol. Blood was sampled on days 1, 2, 4, 7, 14, and 21 after birth for assessment of passive transfer, oxidant status, and fatty acid profile. Health was observed daily. Hip height and body weights were recorded weekly. Data were analyzed with a mixed procedure using SAS 9.4.

Results

FFtrt did not alter concentration of total protein in blood serum, prevalence of diarrhea or other signs of disease, or rate of growth (P>0.05) of calves.

Figure 1B:
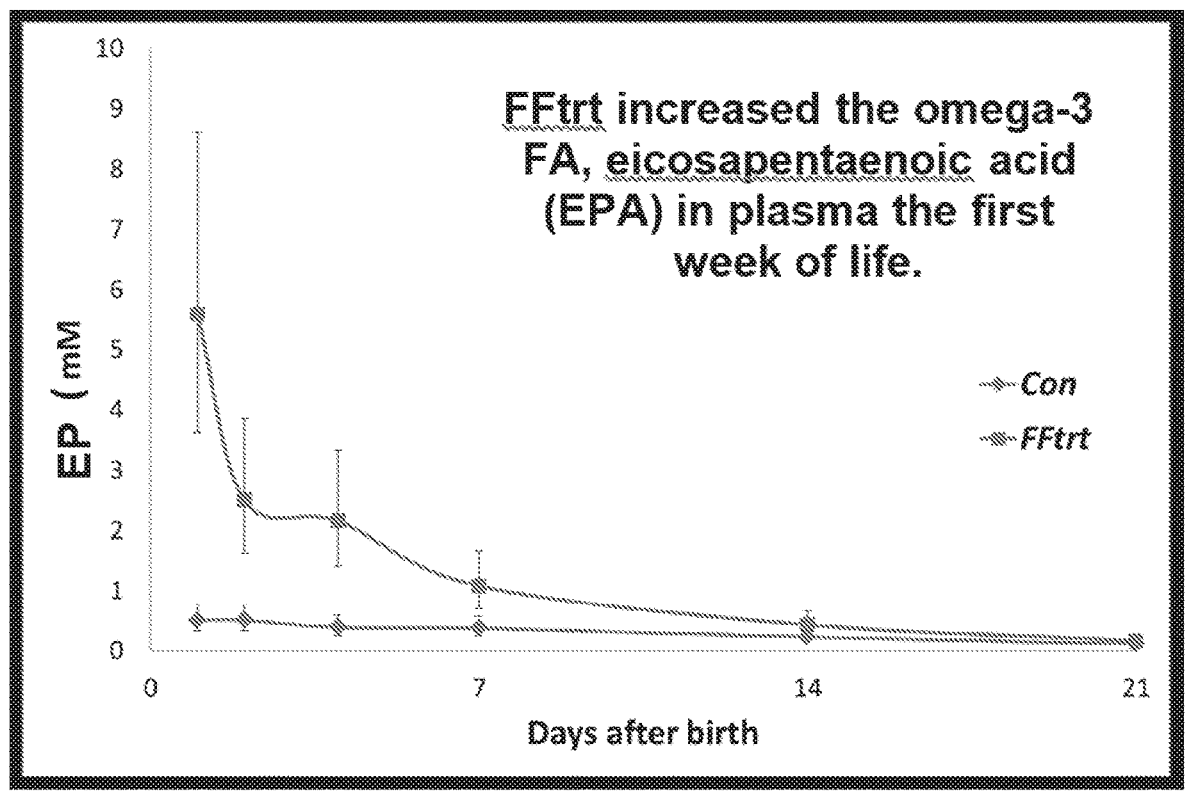
Figure 1C:
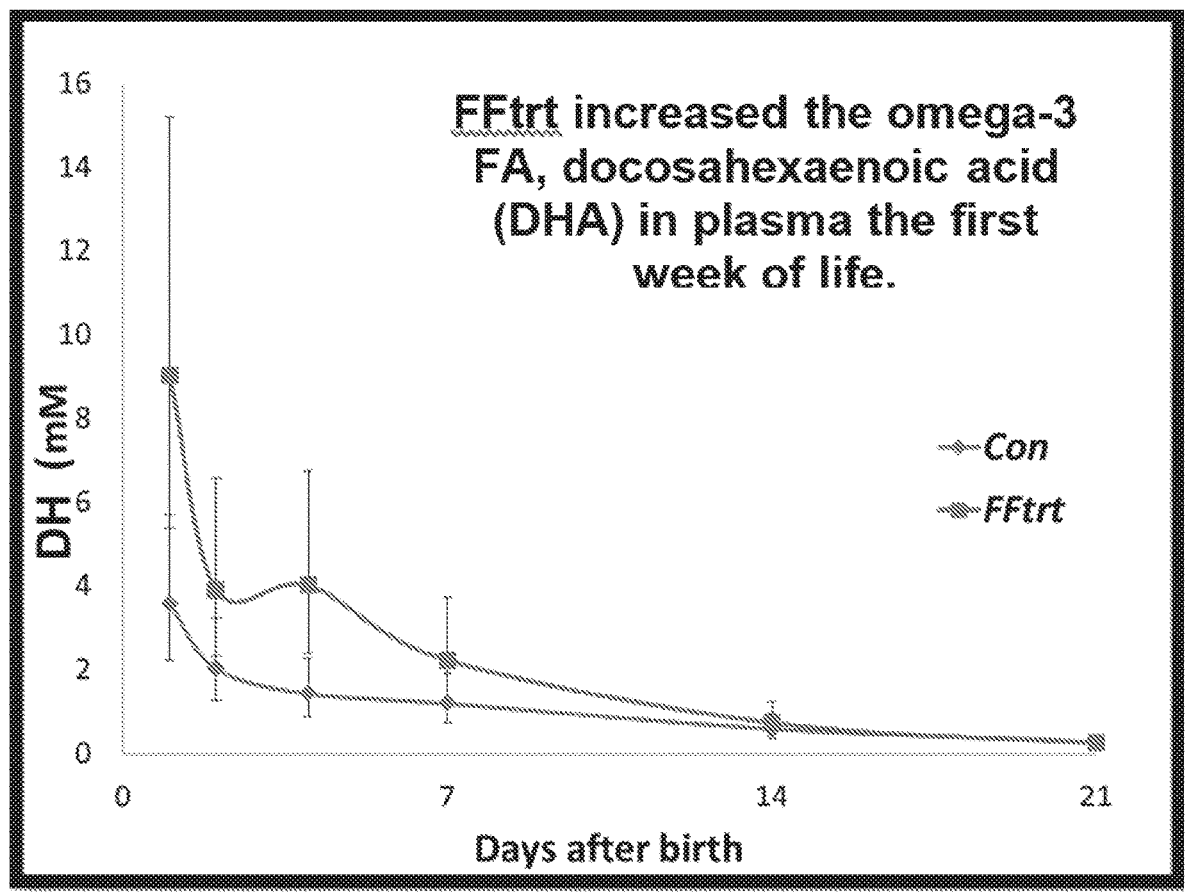
Figure 1D:
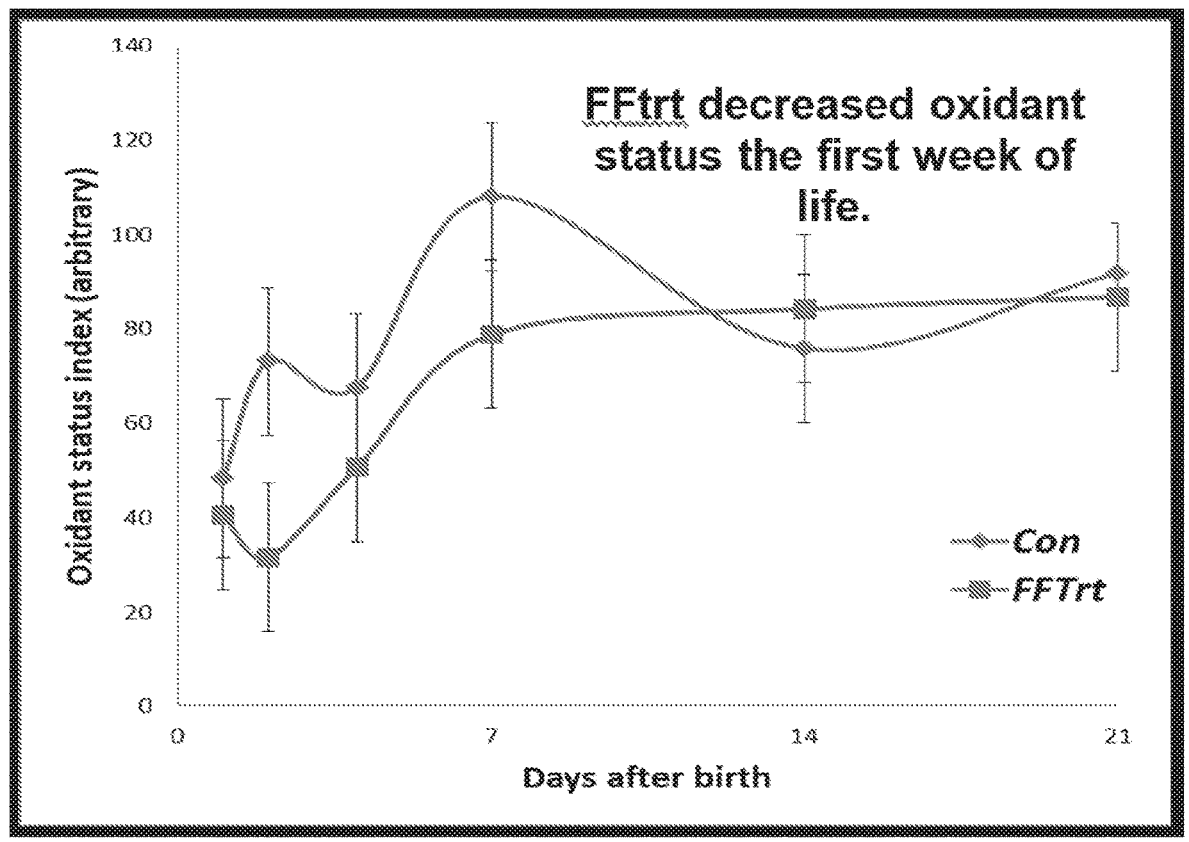

However, FFtrt increased plasma concentrations of n-3 FA as much as 90% within 1 day of age (P<0.001; FIG. 1A-1D). As illustrated in FIG. 1, there was a spike in plasma levels of DHA, EPA, and ALA during the first week of life. Table 1 summarizes the concentrations of DHA, EPA, and ALA in the plasma of control group of calves (which did not receive FFtrt) and in the group of calves that received the FFtrt supplement.

TABLE 1

Calf Plasma Concentrations of DHA, EPA, and ALA

| Plasma Components | Con | FFtrt | P-value |
| --- | --- | --- | --- |
| α-linolenic acid (mm) | 31 | 105 | <0.001 |
| Eicasapentaenoic acid (mM) | 0.43 | 2.4 | <0.001 |
| Docosahexaenoic acid (mM) | 1.8 | 4.5 | 0.01 |
| Oxidant status index (arbitrary units) | 74.4 | 50.3 | <0.01 |

FFtrt also decreased oxidant status by 55% within 2 days of age (P<0.01). However, oxidant status and FA returned to control values by day 14 after birth.

In conclusion, a colostrum supplemented with n-3 fatty acids and α-tocopherol can improve calf health by decreasing oxidant status and increasing plasma n-3 PUFA concentrations in the first week of life. Such treatment improved the indicators of health in calves and helped calves to cope with inflammation and stress.

REFERENCES

Contreras, G. A., S. A. Mattmiller, W. Raphael, J. C. Gandy, and L. M. Sordillo. 2012. Enhanced n-3 phospholipid content reduces inflammatory responses in bovine endothelial cells. J. Dairy Sci. 95: 7137-7150.

Contreras, G. A., W. Raphael, S. A. Mattmiller, J. Gandy, and L. M. Sordillo. 2012. Nonesterified fatty acids modify inflammatory responses and eicosanoid biosynthesis in bovine endothelial cells. J. Dairy Sci. 95:5011-5023.

Sordillo, L. M. and W. Raphael. 2013. Significance of metabolic stress, lipid mobilization, and inflammation on transition cow disorders. Vet. Clinics Food Anim. 29(2): 267-78.

Raphael, W. and L. M. Sordillo. 2013. Dietary polyunsaturated fatty acids and inflammation: the role of phospholipid biosynthesis. Int. J. Mol. Sci. 14: 21167-21188.

Sordillo, L. M. and V. Mavangira. 2014. The *nexus* between nutrient metabolism, oxidative stress and inflammation in transition cows. Animal Prod. Sci. 54:1204-1214.

Raphael, W., L. Halbert, G. Contreras, and L. M. Sordillo. 2014. Association between PUFA-derived oxylipid biosynthesis and leukocyte inflammatory marker expression in periparturient dairy cows. J. Dairy Sci. 97: 3615-3625.

Mavangira, V., J. C. Gandy, C. Zhang, V. E. Ryman, A. D. Jones, and L. M. Sordillo. 2015. Polyunsaturated fatty acids influence differential biosynthesis of oxylipids and other lipid mediators during bovine coliform mastitis. J. Dairy Sci. 98: 6202-6215.

Mavangira, V., M. J. Mangual, J. C. Gandy, and L. M. Sordillo. 2016. 15-F2t-isoprostane concentrations and oxidant status in lactating dairy cattle with acute coliform mastitis. J. Vet. Intern. Med. 30:339-247.

Sordillo, L. M. 2016. Nutritional strategies to optimize dairy cattle immunity. J. Dairy Sci. 99:4967-498.

2007 USDA-APHIS-VS, CEAH. Heifer Calf Health and Management Practices on U.S. Dairy Operations. #N480.10074.

Statistics: Dairy Cows (2012). Compassion in WorldFarming. See website at www.ciwf.org.uk/media/5235182/Statistics-Dairy-cows.pdf Anandan C, Nurmatov U, Sheikh A. Omega 3 and 6 oils for primary prevention of allergic disease: systematic review and meta-analysis. Allergy 64(6):840-848.

BCC Research (2017). Cattle Feed and Feed Additives: Global Markets to 2022). FOD074A.

Dairy Food Global Market Briefing 2019. The Business Research Company.

Erdogan H, Fadillioglu E, Ozgocmen S, Sogut S, Ozyurt B, Akyol O, Ardicoglu O (2004). PLEFA 71(3):149-152.

Hill T M, VandeHaar M J, Sordillo L M, Catherman D R, Bateman II H G, Schlotterbeck R L (2011). Fatty acid intake alters growth and immunity in milk-fed calves. J. Dairy Sci. 94(8): 3936-3948.

Hooper L, Thompson R L, Harrison R A, Summerbell C D, Ness A R, Moore H L, et al. (2006) Risks and benefits of omega 3 for mortality, cardiovascular disease, and cancer: systematic review. BMJ 332: 752-60.

Lago A, Socha M, Geiger A, Cook D, Silva-del-Rio N, Blanc. C, Quesnell R, Leonardi C (2018). Efficacy of colostrum replacer versus maternal colostrum on immunological status, health, and growth of preweaned dairy calves. *J. Dairy Sci.* 101(2):1344-1354.

Ling T, Hernandez-Jover M, Sordillo L M, Abuelo A (2018). Maternal late-gestation metabolic stress is associated with changes in immune and metabolic responses of dairy calves. J Dairy Sci 101(7): 6568-80.

Moallem, U (2018). Roles of dietary n-3 fatty acids in performance, milk fat composition, and reproductive and immune systems in dairy cattle. J. Dairy Sci. 101(10): 8641-8661.

EP 2 214 481 B1/WO 2009/052182: Method for Increasing Performance of offspring.

CA2584401: Food supplement containing fish oil.

All patents and publications referenced or mentioned herein are indicative of the levels of skill of those skilled in the art to which the invention pertains, and each such referenced patent or publication is hereby specifically incorporated by reference to the same extent as if it had been incorporated by reference in its entirety individually or set forth herein in its entirety. Applicants reserve the right to physically incorporate into this specification any and all materials and information from any such cited patents or publications.

The following statements are intended to describe and summarize various features of the invention according to the foregoing description provided in the specification and figures.

Statements:

1. A food supplement for young animals that consists essentially of about 2 g to about 80 g omega-3 fatty acids in colostrum.

2. The food supplement which is a creamy oil-in-water emulsion.

3. The food supplement of statement 1 or 2, further comprising milk solids.

4. The food supplement of statement 1, 2, or 3, wherein the omega-3 fatty acids are provided by fish oil, flax oil, or a combination thereof.

5. The food supplement of statement 1-3 or 4, consisting essentially of 3%-55% by weight offish oil, flax oil, or a combination thereof 6. The food supplement of statement 1-4 or 5, having about 3 g to about 70 g omega-3 fatty acids, or about 4 g to about 60 g omega-3 fatty acids, or about 5 g to about 50 g omega-3 fatty acids, or about 10 to about 40 g omega-3 fatty acids.

7. The food supplement of statement 3-5 or 6, wherein the milk solids comprise colostrum milk solids.

8. The food supplement of statement 1-5 or 6, comprising water in an amount of 35-55% by weight.

9. The food supplement of statement 3-7 or 8, wherein the milk solids are an emulsifier for the oil-in-water emulsion.

10. The food supplement of statement 3-8 or 9, wherein the milk solids are present in an amount of about 4 to about 5% by weight of the supplement.

11. The food supplement of statement 1-9 or 10, optionally further comprising one or more surfactants, sweeteners, flavoring agents, antioxidants, vitamins, preservatives, or a combination thereof.

12. The food supplement of statement 11, wherein the one or more surfactants facilitate formation of an emulsion of the colostrum and the omega-3 fatty acids.

13. The food supplement of statement 11 or 12, wherein the one or more preservatives are present in an amount to inhibit microbial growth.

14. The food supplement of statement 11, 12 or 13, wherein the one or more antioxidants is vitamin E.

15. The food supplement of statement 1-13 or 14, comprising 2.8 to 3 liters of colostrum combined with 30 ml fish oil, 30 ml flax oil, 200 mg vitamin E, and 12 ml Polysorbate 80.

16. The food supplement of statement 1-14 or 15, which is formulated for newborn calves.

17. A method comprising administering the food supplement of statement 1-14 or 15 to a newborn calf.

18. The method of statement 17, wherein administering the food supplement to the calf is done at about 3 minutes to about 12 hours after birth, or at about 5 minutes to about 10 hours after birth, or within about 24 hours after birth of the calf.

19. The method of statement 17 or 18, which increases the concentration of α-linolenic acid (ALA), eicosapentaenoic acid (EPA), docosahexaenoic acid (DHA), or a combination thereof in the plasma of the calf.

20. The method of statement 17, 18 or 19, which decreases the oxidant status of the calf.

21. The method of statement 17-19 or 20, which decreases the calf's inflammatory responses to vaccines.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. One skilled in the art can provide substitutions and modifications to the invention disclosed herein without departing from the scope and spirit of the invention.

The invention illustratively described herein suitably may be practiced in the absence of any element or elements, or limitation or limitations, which is not specifically disclosed herein as essential. The methods and processes illustratively described herein suitably may be practiced in differing orders of steps, and the methods and processes are not necessarily restricted to the orders of steps indicated herein or in the claims.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims and statements of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed:

1. A method comprising administering to one or more newborn calves a food supplement that consists essentially of about 2 g to about 80 g omega-3 fatty acids in colostrum to generate one or more treated calves.

2. The method of claim 1, wherein administering the food supplement to one or more newborn calves is done at about 3 minutes to about 12 hours after birth.

3. The method of claim 1, which increases concentrations of α-linolenic acid (ALA), eicosapentaenoic acid (EPA), docosahexaenoic acid (DHA), or a combination thereof in the plasma of the one or more treated calf.

4. The method of claim 1, wherein the one or more newborn calves are under-weight newborn calves, newborn calves with weak calf syndrome, calves rejected by their mothers, or newborn calves that are unable or slow to rise, stand or nurse.

5. The method of claim 1, which decreases the treated calf's oxidant status or oxidative stress.

6. The method of claim 1, which decreases the treated calf's inflammatory responses to vaccines.

7. A method comprising administering to one or more newborn calves a food supplement that consists essentially of 2.8 to 3 liters of colostrum combined with 30 ml fish oil, 30 ml flax oil, 200 mg vitamin E, and 12 ml Polysorbate 80.

* * * * *